(12) United States Patent  
Logvinov et al.

(10) Patent No.: US 8,565,062 B2  
(45) Date of Patent: Oct. 22, 2013

(54) METHOD AND SYSTEM OF CHANNEL ANALYSIS AND CARRIER SELECTION IN OFDM AND MULTI-CARRIER SYSTEMS

(75) Inventors: Oleg Logvinov, East Brunswick, NJ (US); Lawrence F. Durfee, Washington, NJ (US); Richard Walvis, Santa Cruz, CA (US); Michael J. Macaluso, Jackson, NJ (US)

(73) Assignee: STMicroelectronics, Inc., Coppell, TX (US)

( * ) Notice: Subject to any disclaimer, the term of this patent is extended or adjusted under 35 U.S.C. 154(b) by 344 days.

(21) Appl. No.: 11/899,853

(22) Filed: Sep. 7, 2007

(65) Prior Publication Data

US 2008/0205534 A1 Aug. 28, 2008

Related U.S. Application Data

(63) Continuation of application No. 10/430,151, filed on May 6, 2003, now abandoned.

(60) Provisional application No. 60/378,196, filed on May 6, 2002.

(51) Int. Cl.
*H04J 11/00* (2006.01)

(52) U.S. Cl.
USPC .................................. 370/208; 370/241

(58) Field of Classification Search
USPC .................. 370/203, 208, 210, 219
See application file for complete search history.

(56) References Cited

U.S. PATENT DOCUMENTS

| | | | | |
|---|---|---|---|---|
| 5,761,190 A | * | 6/1998 | Yamauchi et al. | 370/210 |
| 6,400,758 B1 | * | 6/2002 | Goldston et al. | 375/216 |
| 6,442,130 B1 | * | 8/2002 | Jones et al. | 370/208 |
| 6,456,653 B1 | * | 9/2002 | Sayeed | 375/227 |
| 6,628,738 B1 | * | 9/2003 | Peeters et al. | 375/371 |
| 2010/0008434 A1 | * | 1/2010 | Hadad | 375/260 |

OTHER PUBLICATIONS

"Digital Video Broadcasting (DVB); Frame Structure Channel Coding and Modulation for a Second Generation Digital Terrestrial Television Broadcasting System (DVB-T2)," DVB Document A122, Jun. 2010; 179 pages.

"Digital Audio Broadcasting (DAB); Guide to DAB Standards; Guidelines and Bibliography," ETSI TR 101 495, v1.1.1, Nov. 2000, 16 pages.

(Continued)

*Primary Examiner* — Donald Mills  
*Assistant Examiner* — Mon Cheri Davenport  
(74) *Attorney, Agent, or Firm* — Slater & Matsil, L.L.P.

(57) ABSTRACT

The invention presents a novel method to channel estimation in OFDM systems. The embodiment of this invention is a block of new logic and modifications performed to other components of the system, added to any existing OFDM receiver, which utilizes information available from other blocks as found in the receiver. This logic would improve the units' error rate because of the improved channel quality estimations it makes available. This improvement is made possible because both channel noise data and channel signal data are used in the estimation process. This data goes through a learning process over time and multiple data blocks for further improvements in the quality of the estimate. This improvement is possible without any direct communications with other remote units, but it could be used in a multi-node environment to improve the performance of the system as the whole.

18 Claims, 3 Drawing Sheets

(56) References Cited

OTHER PUBLICATIONS

Logvinov, O., et al., "How HomePlug Technologies Enhance the Consumer Experience—A Discussion on the Requirements of the Connected Home, and how HomePlug Technologies Meet the Tough Demands of Consumers," HomePlug Powerline Alliance, 2007, 6 pages.

"HomePlug Technology Field Test Results—A White Paper," HomePlug Powerline Alliance, 2003, 6 pages.

"Home Plug Green PHY—The Standard for In-Home Smart Grid Powerline Communications," Version 1.0, HomePlug Powerline Alliance, Jun. 14, 2010, 17 pages.

"Green PHY by HomePlug," HomePlug Powerline Alliance, date unknown, 4 pages.

"HomePlug & Service Providers—Defining the Platform for High-Value Services in the Home," HomePlug Powerline Alliance, 2004, 4 pages.

"HomePlug 1.0—Technology White Paper," HomePlug Powerline Alliance, 2001, 9 pages.

"HomePlug AV White Paper", HomePlug Powerline Alliance, 2005, 11 pages.

"IEEE Standard for Information Technology—Telecommunications and Information Exchange Between Systems—Local and Metropolitan Area Networks—Specific Requirements," IEEE Std. 802.11™—2007 (Revision of IEEE Std. 802.11-1999), IEEE Computer Society, Jun. 12, 2007, 1233 pages.

International Search Report for International Application No. PCT/US03/13904, dated Nov. 14, 2003, 3 pages.

* cited by examiner

METHOD AND SYSTEM OF CHANNEL ANALYSIS AND CARRIER SELECTION IN OFDM AND MULTI-CARRIER SYSTEMS

CROSS REFERENCE TO RELATED APPLICATION

This application claims the benefit of U.S. Provisional Application No. 60/378,196 filed May 6, 2002, which is incorporated by reference herein.

FIELD OF THE INVENTION

The present invention relates to data communications using Orthogonal Frequency Division Multiplexing (OFDM) techniques. It is not restricted to any one application, but can enhance any OFDM (Orthogonal Frequency Division Multiplexing) implementation including those for single frequency networks, wireless networks and powerline networks.

BACKGROUND OF THE INVENTION

OFDM is a very effective technique for data communications in several environments because of its ability to reduce the negative effects of channel distortions such as selective fading and narrow band interference. ("OFDM for Wireless Multimedia Communications"; by R. van Nee, R. Prasad; Artech House Publishers; 2000; ISBN 0-89006-530-6. OFDM uses a multi-carrier transmission scheme (i.e., sub-channels or tones) for both synchronization and data transfer. Examples of communications systems using OFDM include IEEE 802.11a (IEEE Standard for Wireless LAN Medium Access Control (MAC) and Physical Layer (PHY) specifications and supplements (wireless LAN applications), DAB ("Digital Audio Broadcast, Guide to DAB Standards; Guidelines and Bibliography", ETSI, TR 101 495 V1.1.1), DVB-T ("Digital Video Broadcasting (DVB); Framing structure, channel coding and modulation for digital terrestrial television", ETSI, EN 200,744), HomePlug Powerline Alliance (HPA) Specification 1.0, HomePlug Powerline Alliance Specification AV1.1, and others. The above-listed references are incorporated herein by reference.

In a network of one or more OFDM transmitters, the channel is used to communicate between units and there are time segments when transmitter signals are present and times when there are no transmitter signals on the channel as illustrated FIG. 1. The time durations when transmitters occupy the channel vary depending on parameters such as the block size of the data being sent (payload data or control data). Segments of time when no transmitters occupy the channel have different durations that can vary based on situations such as: a single transmitter sending consecutive blocks of data with gaps between blocks, multiple transmitters contending for access to the channel and a channel idle condition. The lengths of these time segments are predictable (except for the situation where no units are communicating) and can be determined based on knowledge of the appropriate communications standard (e.g., 802.11a, DVB-T, etc.). Knowledge of the communications standard also provides information about the structure of transmitter signals (e.g., preamble structure, priority resolution structure, etc.). Knowing the structure of the signal, especially preset information such as transmission structure, provides data that can be used to estimate the quality of the received signal and the channel itself. Information gathered when no transmitters occupy the channel can be used to estimate channel noise. This approach could be used on the power up of the system or during operation. The information this process would result to may provide a viable input related to the following:

Allocation of pilot tones when necessary;
Detection of other narrow-band signals;
Detection of other wide-band systems;
Detection of beacons, etc.

The quality of each sub-channel at any given time determines how well the overall system can transport data. A good quality sub-channel provides good synchronization information, which is then used to recover data correctly. A poor quality sub-channel could mean data loss due to errors in synchronization or unrecoverable errors in the data itself. Furthermore, time taken to evaluate sub-channel quality as part of the transmission process, time taken to retransmit data due to channel related errors or time taken to regularly distribute estimated channel quality all tend to reduce the overall data rate. Improvements in channel quality estimates used at the local receiver, without direct cooperation with any remote transceivers, would therefore improve the quality of communications (i.e., facilitate higher data rates and reduce error rates).

One of the first steps an OFDM receiver must perform in order to extract data from the channel, is to perform synchronization. Two types of synchronization are required: OFDM symbol boundary identification/timing and sub-carrier frequency/phase offset estimation/correction. FIG. 2 illustrates the blocks in a typical OFDM transceiver (PHY layer). The highlighted blocks in the following list are directly involved in synchronization:

| Transmitter Serial data input | | Receiver Serial data output |
| --- | --- | --- |
| [1] Coding (FEC, Encryption, etc.) | | [15] Decoding (FEC, Encryption, etc.) |
| [2] Interleaving | | [14] De-interleaving |
| [3] Mapping/ Pilot insertion | | [13] Demapping/ Channel correction |
| [4] Modulation | | [12] Demodulation |
| [5] iFFT | | [11] FFT |
| [6] Cyclic extension, windowing & filtering | | [10] Timing and frequency sync & cyclic extension removal |
| [7] DAC, RF Tx & coupler | [8] Powerline Channel | [9] Coupler, RF Rx & ADC |

The transmitter, in some implementations (e.g., 802.11a), inserts several fixed pilots (performed by block #3: Mapping/Pilot Insertion) on particular sub-channels to be used by the receivers channel estimator (sub-channel time and frequency estimations). While on other implementations (notably HPA) this block enables and disables sub-channels in cooperation with remote units (known as tone mapping). Part of the function of block #6 (Cyclic Extension, Windowing and Filtering) is to insert preset synchronization information before the transmission of the data block to be used by the receiver to estimate the timing and frequency offset of each OFDM symbol.

The two key receiver blocks, block #10 (Timing and Frequency Sync & Cyclic Extension Removal) and block #13 (Demapper/Channel Correction), correspond to block #6 and block #3 respectively on the transmit side and are responsible for, among other tasks, synchronization.

The other key receiver component is block #11 that performs FFT's on the channel signal. The output of this block contains amplitude and phase information at every OFDM carrier frequency.

Block #9, although not directly involved in synchronization and data recovery contains AGC circuits, which have an important role in acquiring good signals from the channel.

It is evident from the previous discussion that much of the mechanism needed to gather channel signal and channel noise data is already available within OFDM receivers. This invention focuses on improving both synchronization and data transfer of any OFDM system through the independent and continuous estimation of channel quality for use by the local receiver.

SUMMARY OF THE INVENTION

This invention improves the error rate of an OFDM receiver and the system as the whole by providing the receiver with an improved estimate of channel quality. The system wide benefit is derived from the ability to select the best carriers for the pilot tone insertion as well as the detection and avoidance of already occupied frequencies. The receiver uses the data to improve data synchronization and data recovery. Channel data is gathered during periods when transmitters occupy the channel as well as times when the channel is idle or "silent". The data that is gathered is used in a learning process to improve its effectiveness over time and multiple blocks.

This channel quality estimate is better for several reasons:
1. The best estimate is always ready when the receiver needs it, there is no delay and the estimate is constantly being updated and improved
2. The estimate uses noise data gathered from the idle or "silent" channel as well as data generated by remote unit transmissions
3. In addition to the remote units it is communicating with, channel signal data from all remote transmitters is used in the estimating process
4. The channel noise data used in the estimate goes through a learning process over time
5. The channel signal data used in the estimate goes through a learning process over multiple blocks and multiple transmitters The improved channel quality estimate can be used by the OFDM receiver in many ways that include, but is not limited to—improved carrier selection, improved AGC and so on.

BRIEF DESCRIPTION OF THE FIGURES

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENT OF THE INVENTION

This invention improves OFDM receivers by adding information derived from silent intervals to estimates for the quality of the channel using both channel noise and channel signal data. In the preferred embodiment this process may have a continuous nature or may be performed in the predetermined fashion. Further in the preferred embodiment the enhanced channel estimation data may be used for the following purposes:
Improving accuracy of the channel estimation;
Improving accuracy of the synchronization;
Allocation of pilot tones when necessary;
Detection of other narrow-band signals;
Detection of other wide-band systems;
Detection of beacons, etc.

It is especially important to note that the main benefit in the systems similar to HPA the accuracy of synchronization may be improved through the novel method introduced in this invention; by adding a waiting factor to each carrier the preferred embodiment of the system can greatly improve the accuracy of synchronization.

Figure 1:
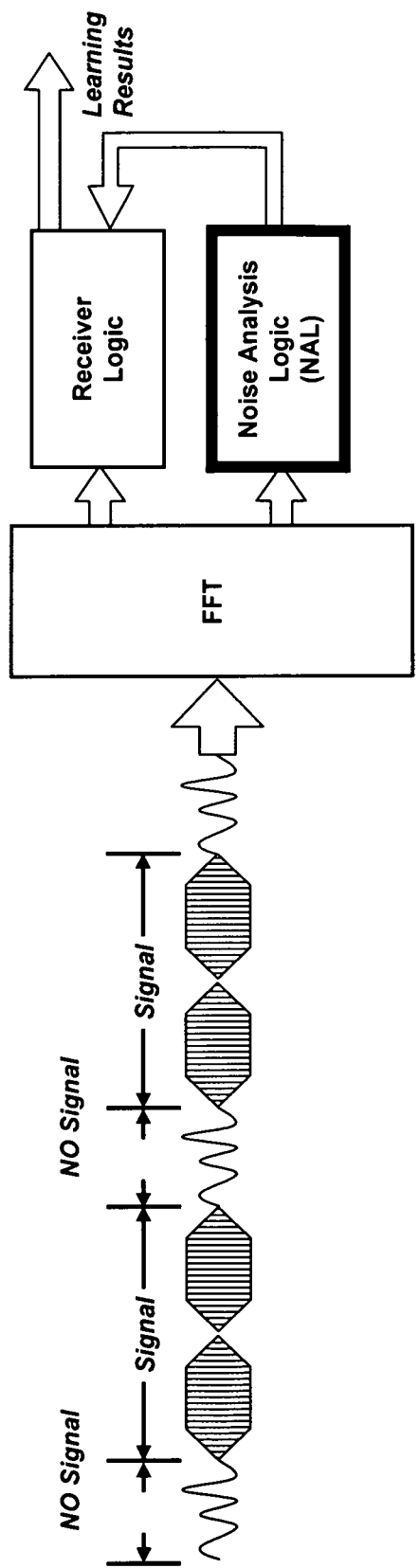
FIG. 1 is a diagram showing any OFDM communications between two stations which will have periods of silence when there is no transmitter using the channel and this concept is shown in the figure. The diagram shows further the three key processing blocks involved in an implementation of this patent idea.
Figure 2:
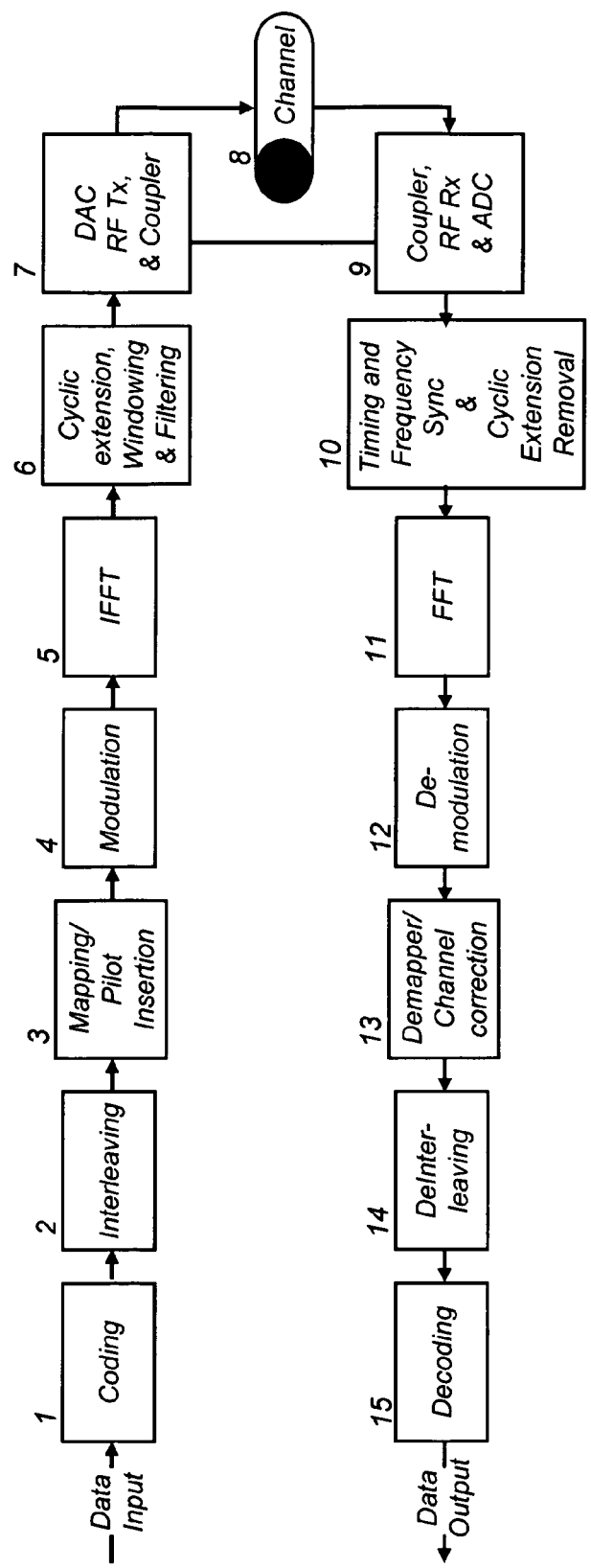
FIG. 2 shows a simplified set of processing blocks (i.e., PHY layer) that would be present in any OFDM transceiver implementation. Interactions with other parts of a complete system (e.g., protocol layer, etc.) are not shown to make the diagram more straightforward.
Figure 3:
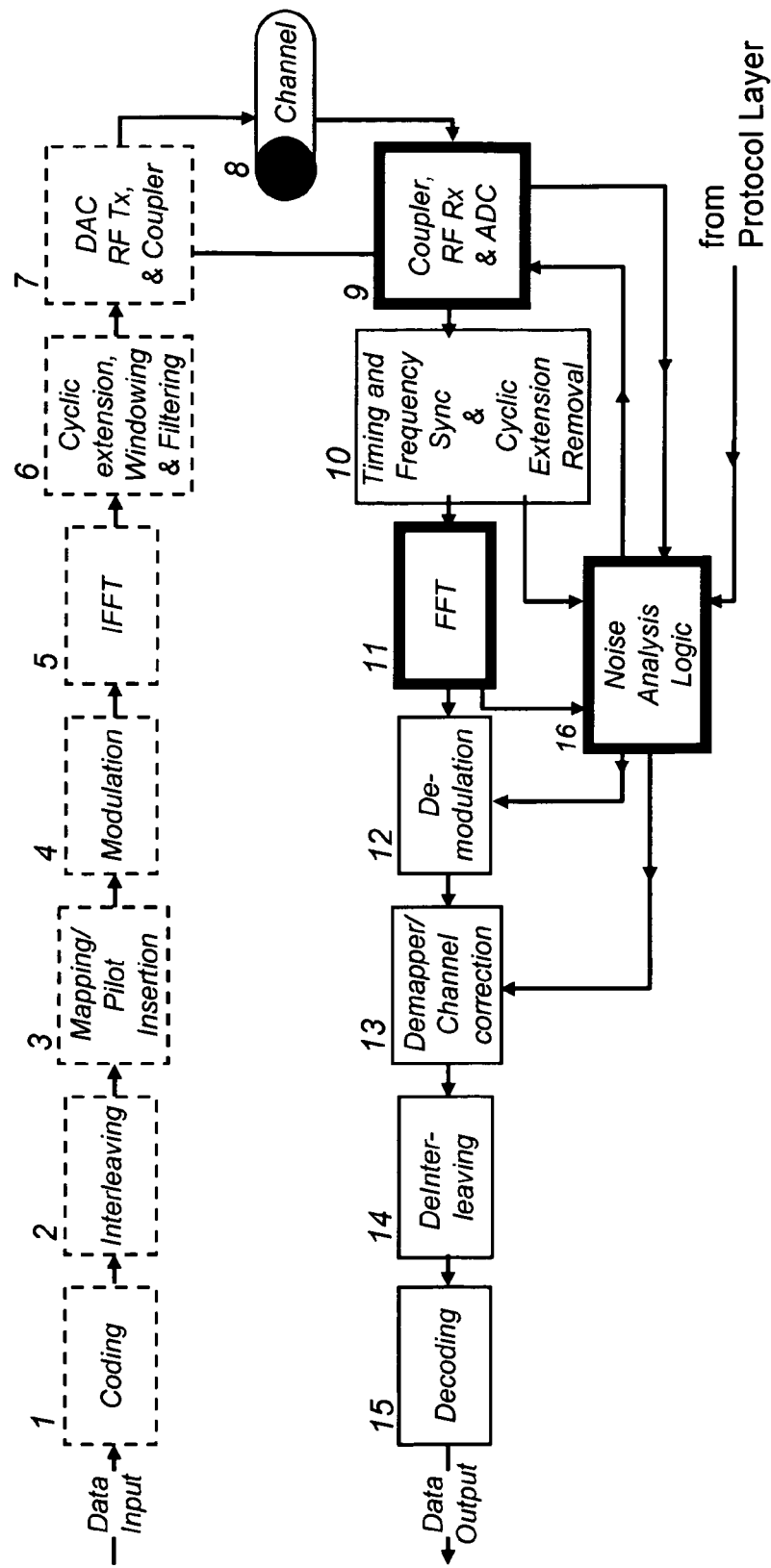
FIG. 3 shows in addition to the previous figure of a noise analysis logic (NAL) block (item #16), connected as shown in the figure, to an existing OFDM transceiver gives the receiver better performance.

As an example, data from the PHY blocks and information from the protocol layer are used. Block #16 (Noise Analysis Logic) in FIG. 3 is the primary element to carry out the process. The inputs to the NAL (Noise Analysis Logic) block are the FFT data (block #11) and data from block #10 (Timing and Frequency Synchronization and Cyclic extension Removal Block) and information from the protocol layer. The outputs include, but are not limited to channel map updates sent to block 13 (Demapper/Channel Correction Block), gain adjustments sent to block #9, and others.

The process proceeds by acquiring FFT data and alternately saving it as either signal data or noise data where the choice is controlled by processed data from block #10 and the protocol layer. These two elements have the necessary information that is used to determine when there are transmitters on the channel or when the channel is idle. The FFT data contains both amplitude and phase information for each of the OFDM carriers (e.g., there are 84 carriers in an HPA system; there can be 1705 carriers in a DVB-T system, etc.). The FFT channel signal data along with the FFT channel noise data then go through a separate learning process over multiple data blocks. The results are processed into a channel quality estimate.

There may be occasions when the channel is idle for long periods of time (i.e., no units are actively involved in communications with other units). During these time periods, estimates of signal quality cannot be made. One possible system level improvement would be to require transceivers to send short, "heart beat" messages from time to time for the express purpose of maintaining a good estimate of channel signal quality. This message would be defined such that no response is required and that it is sent only after the channel has been idle for long periods. This message is not required for this patent, but it would improve performance by allowing channel signal data to be acquired even if the channel remains unused for long periods of time.

Thus, the invention uses channel noise data as well as channel signal data to improve the error rate of any OFDM receiver. Further, the invention uses channel data from the transmitter it is communicating with as well as all transmitters. In addition, the invention applies a learning process on the collected signal and noise data to further improve the error rate of any OFDM receiver. Also, the invention provides an improved estimate of channel quality without the need to directly contact any other transmitters. The receiver can use the enhanced channel quality estimate in at least the following ways:

the receiver's carrier selection process can be improved with the use of the data provided by this invention; the gain control process can be improved with the use of the data provided by this invention; and the receiver's synchronization process can be improved with the use of the data provided by this invention.

Improvement of the accuracy of the channel quality assessment is greatly beneficial to the operation of a single node that uses the method described in this invention. In the multi-node system the ability to analyze the channel may be used to improve the operation of the system as the whole. The information that is gathered by the means of the proposed method can be shared among the nodes in the system. In this case it becomes possible to use this information to optimize the operation of the system. The following exemplifies the use of the information.

In the system that uses pilot tones for synchronization and the media access control it is important to keep the number of pilot tones to the minimum to avoid excessive bandwidth penalties. In the channels with a high level of diversity such as powerline channel the number of tones required to achieve good synchronization may be very large. The described in this invention method allows the system to analyze the channel and select a minimum number of pilot tomes required in such way that most of the tones are received by all nodes of the system. After such determination the system may reallocate pilot tones.

The same approach is applicable for determining the presence of narrow and wide band interferers. Such interferers could be other communication systems. The application of the above describe method would allow to configure the system to avoid the interference and improve the reliability of the communication.

Such system wide optimization may be performed in the centralized component of the system that may be residing on one of the nodes or standalone. Or in the different version of the preferred embodiment such intelligence may be distributed across multiple nodes in the system.

What is claimed:

1. An orthogonal frequency division multiplexing receiving system comprising: a noise analysis logic unit (NAL) for receiving FFT data including at least one of a channel noise data in response to receiving a channel noise during a silent time interval and a channel signal data, wherein the channel signal data is transmitted on a channel by a transmitter, wherein the NAL includes inputs for receiving protocol data and predetermined synchronization data, and wherein the NAL processes the FFT data to identify channel noise data and channel signal data based on the protocol data and the synchronization data.

2. The system according to claim 1, wherein the NAL is coupled to a data processing block which processes the received channel signal data and channel noise data to identify and provide for learning of noise characteristics of the channel and to generate an enhanced channel quality estimate, providing for an improved error rate for data transmission on the channel.

3. The system according to claim 1, further comprising: at least one carrier selection device which utilizes an enhanced channel quality estimate to select a channel for data signal exchange.

4. The system according to claim 1, further comprising: a gain control device which utilizes an enhanced channel quality estimate to control signal gain processing.

5. The system according to claim 1, further comprising: a data signal synchronization device which utilizes an enhanced channel quality estimate as part of synchronization processing.

6. The system according to claim 1, further including a distributed intelligence built into a plurality of nodes that allows the system to process the information collected from all nodes to optimize the operation of the system.

7. The system according to claim 3, further including a waiting factor to the at least one carrier to improve the accuracy of synchronization.

8. A method for providing an orthogonal frequency division multiplexing receiving system comprising the steps of: providing a noise analysis logic unit (NAL) for receiving FFT data including at least one of channel noise data in response to receiving a channel noise during a silent time interval and channel signal data, wherein the channel signal data is transmitted on a channel by a transmitter, and wherein the NAL includes inputs for receiving protocol data and predetermined synchronization data, and further, wherein the NAL processes the FFT data to identify channel noise data and channel signal data based on the protocol data and the synchronization data.

9. The method according to claim 8, further comprising the step of providing silent interval data to derive channel quality assessment data.

10. The method according to claim 8, further comprising the step of utilizing the noise data to select carriers for pilot tone insertion.

11. The method according to claim 8, further comprising the step of exchanging data gathered among all nodes.

12. The method according to claim 11, further providing a dedicated node to process the information collected from all nodes to optimize the operation of the system.

13. The method according to claim 8, further comprising the step of including a distributed intelligence built into a plurality of nodes that allows the processing of the information collected from all nodes to optimize the operation of the system.

14. The system according to claim 2, wherein the noise characteristics data is saved over time and used in a learning process to generate an enhanced channel quality estimate, providing for an improved error rate for data transmission on the channel.

15. The system according to claim 1, further including a distributed intelligence built into a plurality of nodes that allows the system to collect historical data over time from the channel noise data and process the information collected from all nodes to optimize the operation of the system.

16. The method according to claim 8, further comprising the step of exchanging historical noise data gathered among all nodes.

17. The method according to claim 16, further providing a dedicated node to process historical noise information collected from all nodes to optimize the operation of the system.

18. The method according to claim 8, further comprising the step of including a distributed intelligence built into a plurality of nodes that allows the processing of historical noise information collected from all nodes to optimize the operation of the system.

* * * * *